United States Patent [19]

Kisselmann et al.

[11] 3,889,187

[45] June 10, 1975

[54] INDICATING INSTRUMENT

[75] Inventors: Willy Kisselmann, Grunwald; Fritz Rumpelein, Munich; Paul Kopf, Unterhaching, all of Germany

[73] Assignee: Agfa-Gevaert Aktiengesellschaft, Leverkusen, Germany

[22] Filed: Sept. 14, 1970

[21] Appl. No.: 71,918

[30] Foreign Application Priority Data

| Sept. 13, 1969 | Germany | 1946507 |
| Nov. 5, 1969 | Germany | 1955609 |
| Nov. 5, 1969 | Germany | 1955610 |
| Nov. 5, 1969 | Germany | 1955608 |

[52] U.S. Cl. ............. 324/114; 116/129 K; 324/115; 350/112
[51] Int. Cl. .......................... G01r 15/00; G01r 1/08
[58] Field of Search ......... 324/114, 115; 116/129 K, 116/129 T, 129 R, 136.5, 129 F, 129 E, 114 L, 129 L; 350/112, 110

[56] References Cited
UNITED STATES PATENTS 3,590,773    7/1971    Ruppert ......................... 324/115 X

FOREIGN PATENTS OR APPLICATIONS

| 62,241 | 6/1913 | Austria | 350/112 |
| 775,493 | 5/1957 | United Kingdom | 350/112 |

Primary Examiner—Alfred E. Smith
Assistant Examiner—Ernest F. Karlsen
Attorney, Agent, or Firm—Michael S. Striker

[57] ABSTRACT

An indicating instrument for use in radio or television receivers has one or two elongated prisms with an exposed surface, a mirrored surface and a further surface which is adjacent to the straight terminal of a pointer pivotable by a moving-coil instrument. The pivot axis of the pointer is parallel to the terminal and to the further surface of the prism. One or more scales are positioned in the housing of the indicating instrument in such a way that they are either directly observable by looking at the exposed surface of the prism or that the mirrored surface reflects their images toward the exposed surface, together with the image of the terminal which appears as a straight band and moves sideways in response to pivoting of the pointer.

42 Claims, 26 Drawing Figures

INVENTOR
WILLY KISSELMANN
BY FRITZ RÜMPELEIN
PAUL KOPF

INVENTOR
WILLY KISSELMANN
FRITZ RÜMPELEIN
PAUL KOPF

INVENTOR
WILLY KISSELMANN
FRITZ RÜMPELEIN
PAUL KOPF

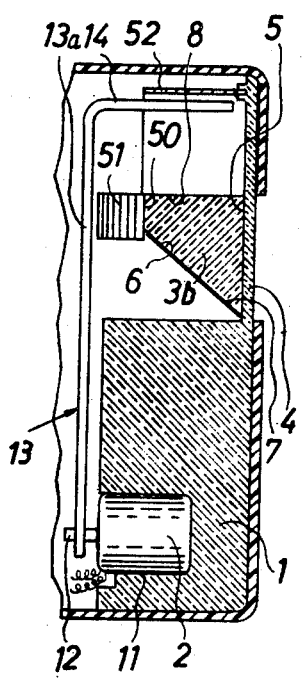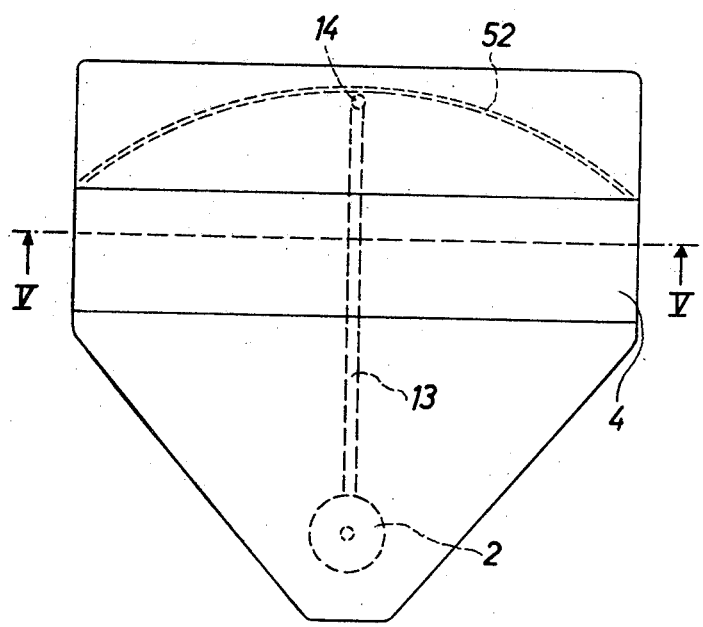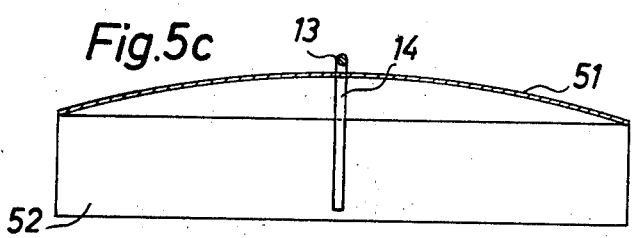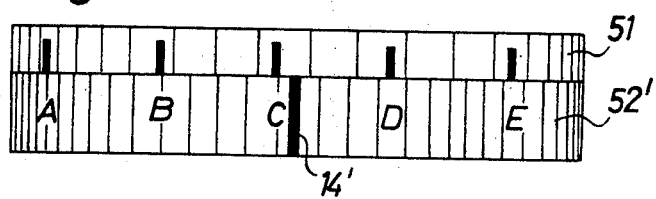

PATENTED JUN 10 1975

SHEET 5

3,889,187

*INVENTOR*
WILLY KISSELMANN
BY FRITZ RÜMPELEIN
PAUL KOPF

*ATTORNEY*

INVENTOR
WILLY KISSELMANN
FRITZ RÜMPELEIN
PAUL KOPF

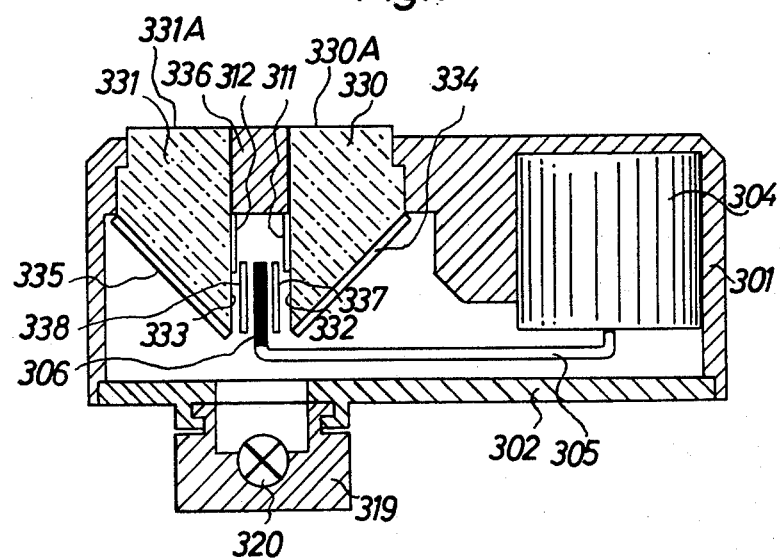

INDICATING INSTRUMENT

BACKGROUND OF THE INVENTION

The present invention relates to indicating instruments in general, and more particularly to improvements in indicating instruments of the type wherein one or more pointers are pivotable with reference to one or more scales to pinpoint selected graduation or graduations on the scales. Still more particularly, the invention relates to improvements in indicating instruments of the type wherein one or more pointers are pivotable by galvanometers or analogous instruments.

SUMMARY OF THE INVENTION

An object of the invention is to provide an indicating instrument which is of simple and compact design, which comprises a small number of relatively simple parts, and which allows for convenient observation of the position of one or more pointers with reference to the associated scale or scales.

Another object of the invention is to provide an indicating instrument which is constructed and assembled in such a way that it can constitute a prefabricated building block for installation in a larger assembly, for example, in the dashboard of an automotive vehicle, in a control panel, in a radio or television receiver or the like.

A further object of the invention is to provide an indicating instrument which enables the user to readily distinguish between indications on two or more different scales, which can be mass-produced at a reasonable cost, and which insures that the user can invariably see a clear image or portion of the pointer or needle in each of its indicating positions.

An additional object of the invention is to provide an indicating instrument which is constructed and assembled in such a way that it furnishes indications at all times or only at the will of the user.

Another object of the invention is to provide an indicating instrument which can be used in connection with many presently known electric circuits to indicate the condition of such circuits.

The indicating instrument of the present invention comprises a housing, a one-piece or composite prism installed in the housing and having at least one mirrored light-reflecting surface and a plurality of additional surfaces including at least one exposed surface and a second additional surface, at least some surfaces of the prism meeting each other along a plurality of elongated edges, at least one pointer mounted in the housing for pivotal movement about a predetermined axis and having an elongated terminal which is adjacent to the prism, at least substantially parallel to the second additional surface and at least substantially normal to the edges of the prism in each position of the pointer, one or more moving-coil instruments or analogous means for pivoting the pointer, and scale means provided in the housing in such position as to be observable, with at least a portion of the terminal, by looking through the exposed surface of the prism. The image of at least a portion of the terminal is reflected toward the exposed surface by the mirrored surface of the prism and the scale means cam be positioned in such a way that it is directly observable through the exposed surface or that the person looking at such exposed surface sees the reflected image of the scale means. The image of the terminal appears as a band or strip which travels sideways in the longitudinal direction of the scale means when the pointer is caused to pivot.

The novel features which are considered as characteristic of the invention are set forth in particular in the appended claims. The improved indicating instrument itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2b is a front elevational view of the second indicating instrument as seen from the right-hand side of FIG. 2a;

FIG. 3b illustrates the images of the scale and terminal as seen by looking at the exposed surface of the prism in the indicating instrument of FIG. 3a;

FIG. 4b is a transverse sectional view of the scale and prism in the indicating instrument of FIG. 4a;

FIG. 5a is a fragmentary central sectional view of a fifth indicating instrument;

FIG. 5b is a front elevational view of the fifth indicating instrument as seen from the right-hand side of FIG. 5a;

FIG. 5c is a view as seen in the direction of arrows from the line V—V of FIG. 5b;

FIG. 5d shows the images of one of the scale means and of the terminal of the pointer as well as the other scale means as seen by looking at the exposed surface of the prism in the indicating instrument of FIGS. 5a and 5b;

FIG. 6b illustrates the images of the scale means and of the terminal of the pointer as seen while looking at the exposed surface of the prism in the indicating instrument of FIG. 6a;

FIG. 16 is a sectional view of still another indicating instrument which comprises two discrete prisms.

DESCRIPTION OF THE PREFERRED EMBODIMENTS

Figure 1A:
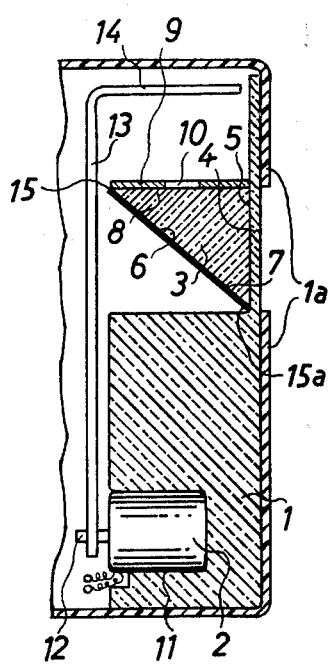
FIG. 1a is a fragmentary central sectional view of an indicating instrument which embodies one form of the invention.
Figure 1B:
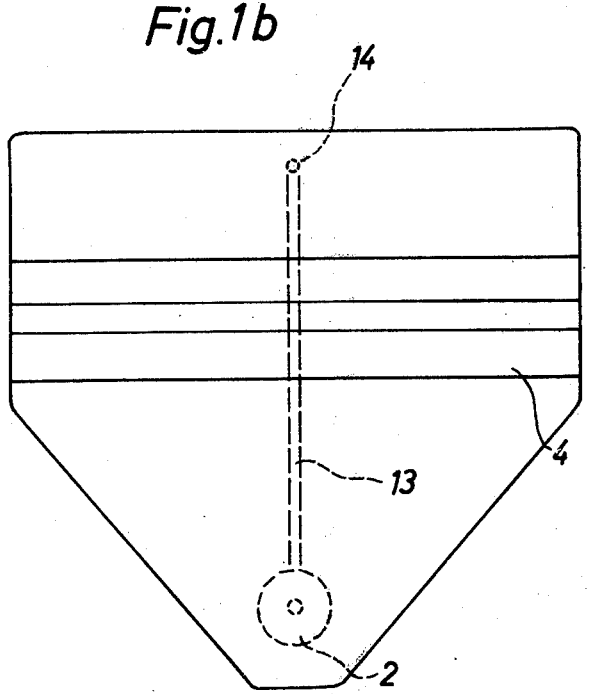
FIG. 1b is a front elevational view of the indicating instrument as seen from the right-hand side of FIG. 1.
Figure 1C:
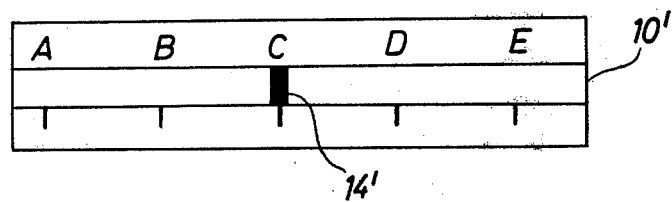
FIG. 1c shows the images of the scale and of the terminal of the pointer by looking at the exposed surface of the prism in the indicating instrument of FIGS., 1a and 1b.

Referring first to FIGS. 1a to 1c, there is shown a first indicating instrument which comprises a housing including a shell 1a and a block-shaped support 1 which is mounted in the shell 1a and is provided with a recess 11 for a moving-coil instrument 2 constituting a means for pivoting a pointer 13 between an infinite number of positions. The pointer 13 is pivotable about the axis of an output shaft 12 of the instrument 2. The housing further accommodates a transparent one-piece prism 3 having a mirrored surface 6 which is coated with a layer 7 of light-reflecting material, and two additional surfaces 5 and 8 which meet the surface 6 along two elongated edges 15, 15a. The surface 5 is exposed, i.e., it can be seen by looking at the front side of the housing, and this surface makes with the surface 8 an angle which at least approximates 90°. Each of the additional surfaces 5, 8 makes with the mirrored surface 6 an acute angle. The prism 3 is secured to a plate-like extension 4 of the support 1 and this extension is transparent, at least in front of the exposed surface 5, so that the observer can see the images of a flat scale 9 and of a terminal or end portion 14 of the pointer 13 by looking through the extension 4. Such images are reflected by the mirrored surface 6.

The scale 9 is provided with graduations denoted by the characters A, B, C, D, E (see FIG. 1c) and is attached or at least immediately adjacent to the additional surface 8. This scale has a longitudinally extending light-transmitting slot or transparent portion 10 which extends lengthwise of the surface 8. The terminal 14 of the pointer 13 is parallel to the surface 8 and is normal to the edges 15, 15a of the prism 3 in each angular position of the pointer, Furthermore, the terminal 14 is parallel to the output shaft 12, i.e., to the pivot axis of the pointer 13. The width of the surface 8 exceeds the width of the surface 5; therefore, the surface 8 can carry a relatively wide scale.

The observer looking at the exposed surface 5 of the prism 3 sees a flat image of the scale 9 and a bar- or strip-shaped image 14' of a portion of the terminal 14. The terminal 14 is preferably round so that the width of its image 14' is at least substantially constant in each angular position of the pointer 13. The observer sees that portion of the terminal 14 which extends across the transparent or light-transmitting portion 10 of the scale 9. When the pointer 13 pivots, the image 14' travels sideways and remains normal to the longitudinal direction of the image 10' of the scale portion 10.

An important advantage of our indicating instrument is that the observer invariably sees a clear image 14' of the terminal 14 and that such image travels sideways, always at right angles to the longitudinal direction of the image of the scale 9. Thus, even though the pointer 13 pivots about the axis of the shaft 12, the image 14' of its terminal 14 appears to move sideways adjacent to the plane of the scale 9, regardless of the angular position of the pointer. The observer gains the impression that a strip or band (image 14') travels sideways along the scale.

Another advantage of the indicating instrument is that it occupies little room. This is attributable in part to the novel configuration of the pointer 13, particularly to the fact that the terminal 14 is parallel to the axis of the shaft 12 and normal to the meeting edges of surfaces on the prism 3. The image of the scale 9 appears to be flat because this scale is attached or applied to the flat surface 8 of the prism 3. The distance between the terminal 14 and the surface 8 decreases whenever the pointer leaves the central position shown in FIG. 1b. The mirrored surface 6 of the prism faces toward the pivot axis of the pointer.

Figure 2A:
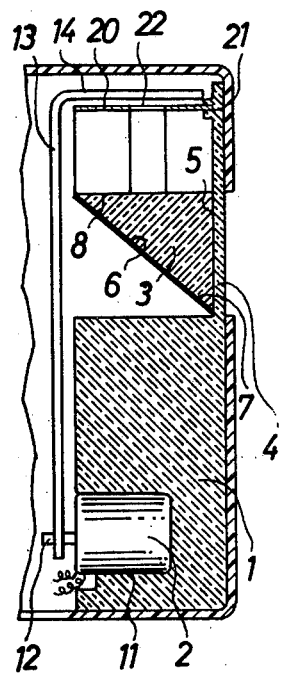
FIG. 2a is a fragmentary central sectional view of a second indicating instrument.
Figure 2B:
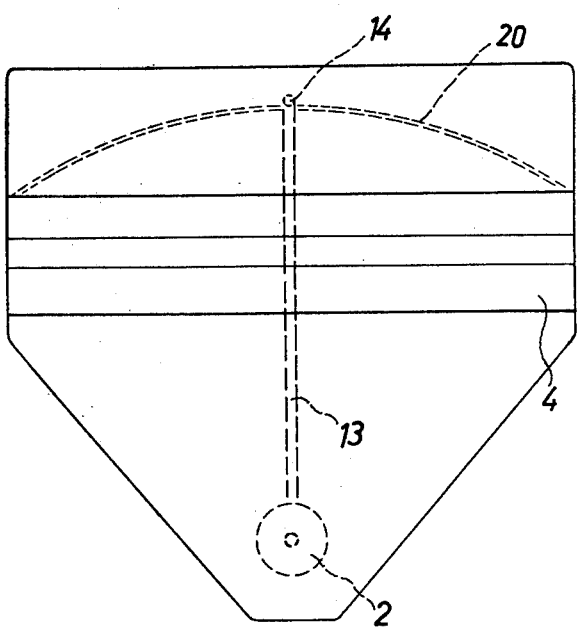
Figure 2C:
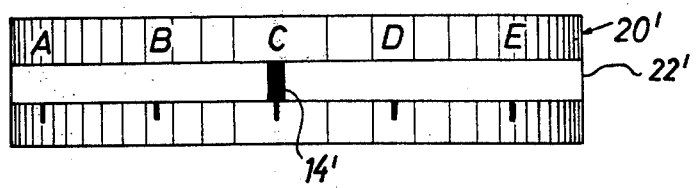
FIG. 2c illustrates the images of the scale and of the terminal of the pointer as seen by looking at the exposed surface of the prism in the indicating instrument of FIGS. 2a and 2b.

All such parts of the second indicating instrument, shown in FIGS. 2a to 2c, which are clearly identical or analogous to the corresponding parts of the first indicating instrument are denoted by similar reference characters. The main difference between the two indicating instruments is that the flat scale 9 of FIGS. 1a–1c is replaced with an arcuate scale 20 whose convex side faces the terminal 14 of the pointer 13. Thus, the end portions of the scale 20 are adjacent to the respective end portions of the additional surface 8 but the median portion of the scale 20 arches away from such surface. The front marginal portion of the scale 20 is received and held in an arcuate slot 21 provided in the plate-like extension 4 of the support 1. The mounting of the scale 20 is preferably such that it can be readily removed for cleaning or for replacement with another scale. This enhances the versatility of the indicating instrument. The curvature of the convex side of the scale 20 at most equals the curvature of the path along which the terminal 14 travels when the moving-coil instrument 2 causes the pointer 13 to pivot about the axis of the output shaft 12. It will be noted that the terminal 14 is adjacent to the convex outer side of the scale 20, i.e., that the scale is disposed between the terminal and the additional surface 8 of the prism 3. The indicating instrument of FIG. 2 is constructed in such a way that the observer who is looking at the outer side of the extension 4 sees the image 22' of the slot 22 in the scale 20 and the image 14' of the terminal 14 whereby the image 14' is free of parallax. The character 20' denotes the image of the scale 20. The panoramic image 20' is curved or arched, i.e., its central portion appears to be remotest from the extension 4. The graduations of the scale 20 are denoted by the characters A to E but it is clear that such characters can be replaced by digits or other symbols. The same applied for the characters A–E shown in FIG. 1c. The image 14' of the terminal 14 is normal to the longitudinal direction of the image 22' in each angular position of the pointer 13.

Figure 3A:
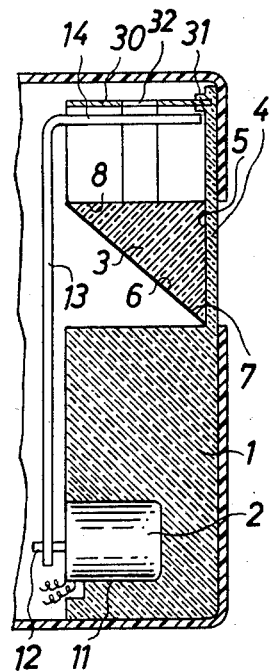
FIG. 3a is a fragmentary central sectional view of a third indicating instrument which constitutes a slight modification of the indicating instrument shown in FIGS. 2a and 2b.
Figure 3B:
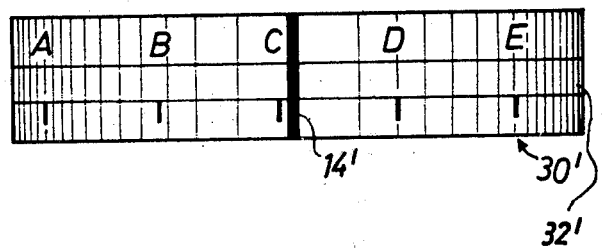

The indicating instrument of FIGS. 3a and 3b differs from that shown in FIGS. 2a–2c in that the terminal 14 of the pivotable pointer 13 is adjacent to the concave inner side of the arcuate scale 30. The front marginal portion of the scale 30 is received in an arcuate slot 31 of the extension 4, and this scale has a longitudinally extending light-transmitting portion 32 (e.g., a slot) whose image is indicated at 32'. The image of the scale 30 is shown at 30'. The curvature of the inner side of the scale 30 preferably equals or at least approximates the curvature of the path along which the terminal 14 moves when the moving-coil instrument 2 pivots the pointer 13 about the axis of the output shaft 12. Since the terminal 14 is located in front of the scale 30, its image 14' appears as an elongated strip or band which extends across the entire image 30'. The latter image curves rearwardly from its longitudinal ends toward the center.

Figure 4A:
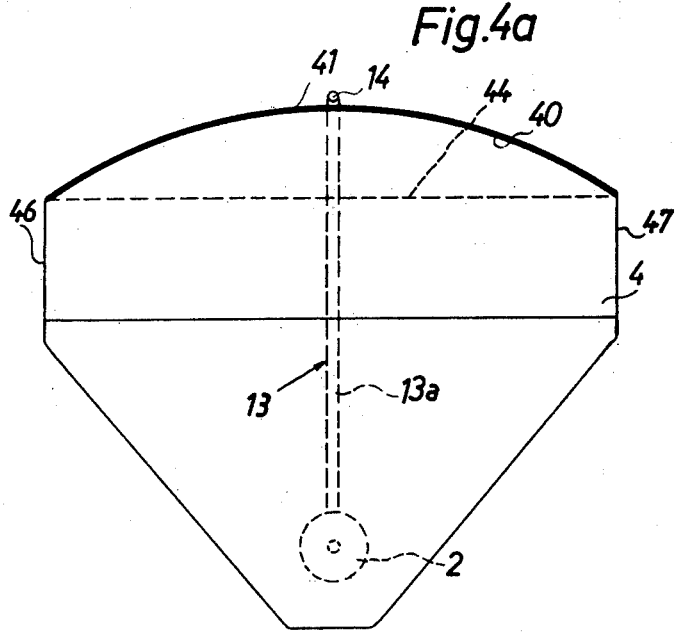
FIG. 4a illustrates in a front elevational view certain details of a fourth indicating instrument.
Figure 4B:
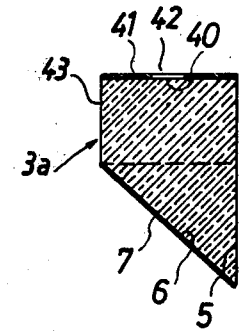

FIGS. 4a and 4b illustrate a portion of a fourth indicating instrument which employs a modified prism 3a. This prism has an exposed surface 5, a mirrored surface 6 (provided with a layer 7 of light-reflecting material), a second additional surface 40 whose width is considerably less than the maximum width of the exposed surface 5, and a third additional surface 43 which is parallel to the exposed surface 5 and is flanked by the surfaces 40 and 6. The scale 41 is adjacent to the surface 40 and has a longitudinally extending light-transmitting portion 42. The surface 40 of the prism 3a is curved whereby its curvature at most equals the curvature of the path along which the terminal 14 moves when the pointer 13 is caused to pivot by the moving-coil instrument 2. The surface 43 constitutes a segment of a circular surface and the upper portion of the surface 5 also resembles a segment.

If desired, the arcuate scale 41 can be replaced with a flat scale 44 (indicated by broken lines) which is embedded into the prism 3a so as to be located in a plane which is parallel to the terminal 14 and normal to the main portion 13a of the pointer 13 when the latter assumes the central position shown in FIG. 4a. The scale 44 is preferably inserted in the plane which includes the transverse edges along which the surface 40 meets the end surfaces 46, 47 of the prism 3a.

FIGS. 5a to 5d illustrate a further indicating instrument whose prism 3b has four flat surfaces including a mirrored surface 6, a first additional (exposed) surface 5, a second additional surface 8 which is adjacent to the concave inner side of an arcuate scale 52, and a third additional surface 50 which is parallel to the exposed surface 5. The surface 50 is located in front of a second arcuate scale 51 which is directly observable by looking through the extension 4 of the support 1 and through the exposed surface 5. The scale 51 is located in front of a median portion 13a of the pointer 13 whose terminal 14 is adjacent to the convex outer side of the scale 52. The concave side of the scale 51 faces the surface 50 of the prism 3b. The curvature of the convex side of the scale 51 preferably at least approximates the curvature of the path along which the terminal 14 travels when the pointer 13 is pivoted by the moving-coil instrument 2. The numeral 12 denotes the output shaft of the moving-coil instrument; this shaft is parallel to the terminal 14. As shown in FIG. 5d, the observer sees the images 52' and 14' of the scale 52 and terminal 14. These images are reflected by the layer 7 on the surface 6 of the prism 3b. In addition, the observer sees the scale 51 which is directly visible through the extension 4 and the exposed surface 5. The scale 51 has graduations which are identified by the symbols A to E on the scale 52. The curvature of the scale 51 matches or at least approximates that of the scale 52. It is clear that the scale 51 may be provided with a small number of widely spaced graduations and that the scale 52 may be provided with closely adjacent graduations, or vice versa. Also, the graduations on the scale 52 can be identified by symbols on the scale 51.

Figure 6A:
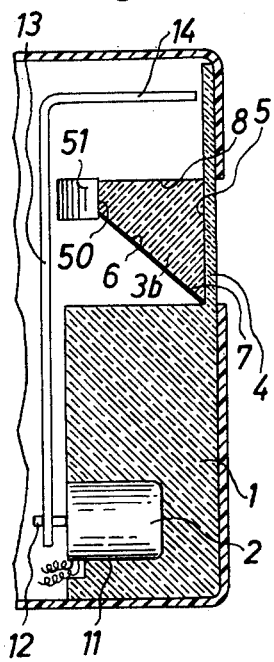
FIG. 6a is a fragmentary central sectional view of a sixth indicating instrument.
Figure 6B:
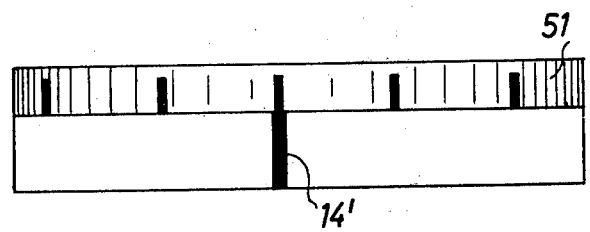

FIGS. 6a and 6b illustrate another indicating instrument which is practically identical with the instrument of FIGS. 5a–5d excepting that it comprises a single scale, namely, the arcuate scale 51 which is adjacent to the third additional surface 50 of the prism 3b. As shown in FIG. 6b, an observer can see through the extension 4 the entire scale 51 and the image 14' of the terminal 14. Thus, the indicating instrument can be so constructed that the surface 6 merely reflects the image of the terminal whereas the scale is applied in such a way that it can be seen directly by looking through the exposed surface 5.

Figure 7:
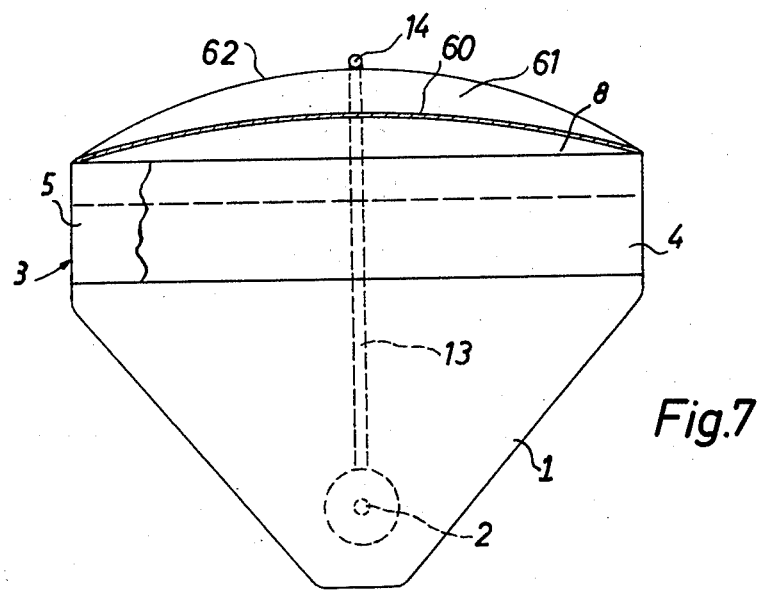
FIG. 7 is a front elevational view of a seventh indicating instrument.

FIG. 7 shows a further indicating instrument having an arcuate scale 60 which is outwardly adjacent to the flat surface 8 of the prism 3. The curvature of the scale 60 is less than the curvature of the path along which the terminal 14 of the point 13 travels. In order to eliminate parallax, the indicating instrument comprises a light-transmitting insert or body 61 whose concave side is adjacent to the convex side of the scale 60 and whose convex side 62 is adjacent to the path for the terminal 14. The insert 61 can be affixed to the shell and/or to the support 1 of the housing. The curvature of the convex outer side 62 of the insert 61 preferably matches the curvature of the path for the terminal 14.

Figure 8:
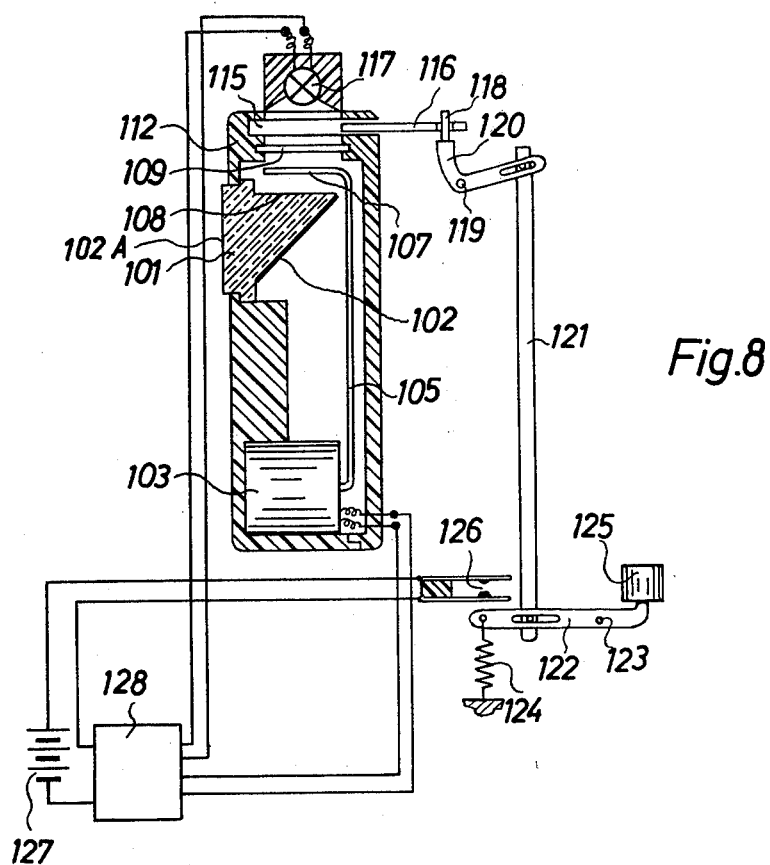
FIG. 8 is a schematic central sectional view of an indicating instrument with several pointers.
Figure 9:
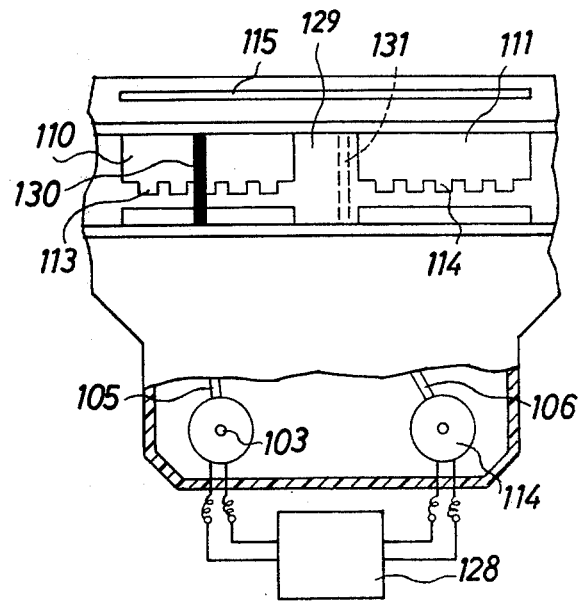
FIG. 9 is a fragmentary front elevational view as seen from the left-hand side of FIG. 8.
Figure 10:
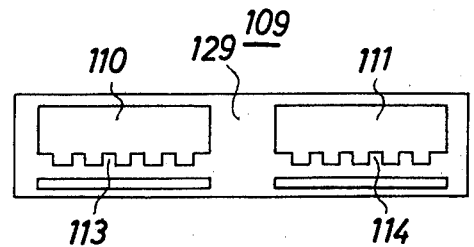
FIG. 10 illustrates the scale in the indicating instrument of FIGS. 8 and 9.

FIGS. 8 to 10 illustrate a further indicating instrument wherein the housing 112 accommodates two parallel moving-coil instruments 103, 104. The housing 112 further contains a prism 101 having a mirrored surface 102, an exposed first additional surface 102A, and a second additional surface 108 which is substantially normal to the surface 102A. The instruments 103, 104 respectively serve to pivot points 105, 106 having terminals (only the terminal 107 of the pointer 105 can be seen in FIG. 8) which are parallel to the surface 108 and to the output shafts of the respective moving-coil instruments. The pointers 105, 106 are of identical size and shape.

A scale 109 is mounted in the housing 112 above the terminals of the pointers 105, 106; this scale is received in suitable slots provided therefor in the front and rear walls of the housing 112 and has two light-transmitting windows 110, 111 which are respectively adjacent to the terminals of the pointers 105, 106 (see FIG. 9). The scale 109 is further provided with graduations 113, 114 which are respectively adjacent to the windows 110, 111 so that they can be pinpointed by the respective terminals.

The housing 112 is formed with guide means or ways 115 located above the scale 109 and serving to receive and guide a reciprocable slide or screen 116 of colored light-transmitting material. A light source 117, here shown as an electric lamp, is mounted in the housing 112 above the ways 115 so that it can illuminate the slide 116 and/or the scale 109. If desired, the slide 116 can be replaced by two discrete slides, one for each of the windows 110, 111. If the number of slides exceeds one, such number preferably equals the number of moving-coil instruments and each slide is movable into and from a position of overlap with one of the windows in the scale. Also, if the indicating instrument comprises two or more slides, each slide can have a different tint or coloration.

The rear portion of the slide 116 has a slot or notch for the upper arm 118 of a bell crank lever 120 which is pivotable on a fixed pin 119 and is articulately coupled to the upper end portion of a rod or bar 121 by means of a pin-and-slot connection. The lower end of the rod 121 is similarly connected with a two-armed lever 122 which is pivotable on a fixedly mounted pin 123 and whose left-hand arm is biased in a counterclockwise direction, as viewed in FIG. 8, by a helical spring 124. The right-hand arm of the lever 122 is provided with a manually operable pushbutton or knob 125.

The left-hnd arm of the lever 122 serves as a trip which can close a normally open master switch 126 in response to depression of the knob 125. The master switch 126 is installed in a control circuit 128 and serves to connect this circuit with a source 127 of electrical energy. The circuit 128 is further connected with the moving-coil instruments 103, 104 and with the light source 117. The purpose of the control circuit 128 is to open the circuit of the moving-coil instrument 103 when the terminal 107 of the pointer 105 reaches the position of maximum deflection. At the same time, the control circuit 128 completes the circuit of the second moving-coil instrument 104 so that the terminal of the pointer 106 can leave its zero position. However, it is eaually possible to construct the control circuit 128 in such a way that the movement of the terminal 107 to the position of maximum deflection merely results in completion of the circuit of the moving-coil instrument 104 while the circuit of the instrument 103 remains completed.

As shown in FIG. 9, the scale 109 has an opaque concealing portion or partition 129 which is located between the windows 110, 111.

The operation of the indicating instrument shown in FIGS. 8 to 10 is as follows:

When the user decides to depress the knob 125, the master switch 126 is closed in response to initial pivoting of the lever 122 so that the energy source 127 is connected with the control circuit 128. The circuit 128 connects the light source 117 with the energy source 127 so that the light source illuminates the scale 109. As the user continues to press the knob 125, the linkage including the levers 122, 120 and rod 121 causes the slide 116 to enter the ways 115 against the opposition of the spring 124. By looking at the exposed surface 102A of the prism 101, the user then sees the images of the windows 110, 111 in the color or colors determined by the slide 116. The image 130 of the terminal of the pointer 105 is visible as a band which is normal to the longitudinal direction of the scale 109 and which travels in front of the images of the window 110 and graduations 113. When the terminal 107 reaches the extreme position of maximum deflection, its image 130 is concealed behind the opaque partition 129 of the scale 109. The control circuit 128 then automatically completes the circuit of the moving-coil instrument 104 so that the image 131 of the terminal of the pointer 106 can move from behind the partition 129 and along the images of the graduations 114. Such mode of operation creates the impression that a single strip- or bar-shaped band (130, 131) travels from the one toward the other end of the scale 109.

As mentioned above, the indicating instrument of FIGS. 8 to 10 can be provided with several discrete slides or screens, one for each moving-coil instrument. Such an indicating instrument can be provided with several manually operable knobs 125 or the like, one for each slide. Each slide may be of a different color and the user can press any one of the knobs to thereby complete the circuit of the corresponding moving-coil instrument and enable the associated pointer to move its terminal along the respective section of the scale.

When the knob 125 of FIG. 8 is released, the spring 124 contracts and pivots the lever 122 back to the illustrated position whereby the lever 122 retracts the slide 116 from the ways 115 and thereupon opens the master switch 126 to disconnect the control circuit 128 from the energy source 127. The circuit 128 then opens the circuit of the light source 117 and the circuit of the moving-coil instrument 104 and/or 103. The exact manner in which the control circuit 128 can connect the energy source 127 with the light source 117 and with the moving-coil instruments 103, 104 forms no part of the present invention.

An advantage of the indicating instrument of FIGS. 8 and 9 is that the length of its scale 109 is not dependent on the length of the pointers. Thus, the length of the scale 109 can be a multiple of the shortest distance between the two extreme positions of the terminal on the pointer 105 or 106. Those portions of the pointers 105, 106 which connect their terminals with the respective moving-coil instruments 103, 104 are preferably located in a common plane. Each terminal is movable along a predetermined portion of the surface 108. Were the pointers 105, 106 replaced with a single pointer which would sweep along the full length of the surface 108, the moving-coil instrument for the single pointer would have to be placed at a much greater distance from the surface 108 and the housing would have to be enlarged so as to accommodate the terminal of the single pointer in each angular position of such pointer.

Since the partition 129 conceals the terminal 107 in the right-hand end position of the pointer 105 (as viewed in FIG. 9), and since this partition also conceals the terminal of the pointer 106 in the zero position of the pointer 106, the observer sees only the image of one of the terminals and such image appears to travel sideways between the ends of the scale 109. Each of the two sections of the scale 109 can be of a different color.

The partition 129 of the scale can be replaced with a concealing strip which is applied directly to the surface 108 of the prism 101. Such strip conceals the terminal 107 of the pointer 105 in its extreme position and the terminal of the pointer 106 in its zero position.

Figure 11:
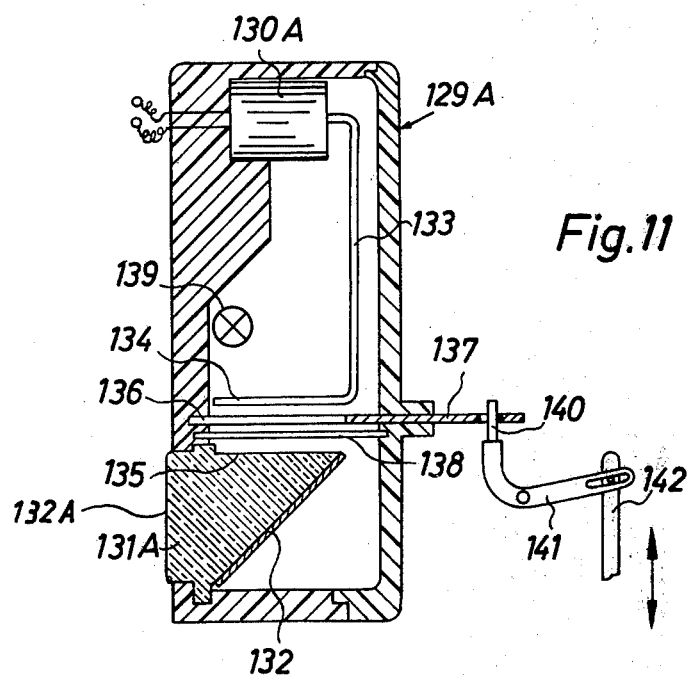
FIG. 11 is a sectional view of an indicating instrument which constitutes a modification of the instrument shown in FIGS. 8 and 9.

The indicating instrument of FIG. 11 is similar to that of FIGS. 8 to 10. The housing 129A contains several (for example, two) moving-coil instruments 130A each of which can pivot a discrete pointer 133 having a terminal 134 which is parallel to the pivot axis of the respective pointer and to the additional surface 135 of a prism 131A. The mirrored surface of the prism 131A is shown at 132, and the exposed surface at 132A. The instruments 130A are mounted in the housing 129A at a level above the prism 131A. The light source 139 is mounted in the housing 129A above the terminals 134 and the housing has slots for the longitudinally extending marginal portions of a scale 138 which is preferably identical with the scale 109 of FIGS. 8–10. The scale 138 is disposed between the surface 135 and the terminals 134, and the housing 129A has guide means or ways 136 for an opaque slide or screen 137 which is disposed between the terminals 134 and the scale 138 when the indicating instrument is not in use. The means for moving the slide 137 to and from the position shown in FIG. 11 is preferably analogous to the linkage of FIG. 8. FIG. 11 merely shows a bell crank lever 141 whose arm 140 is coupled with the slide 137, and a rod 142 which is coupled to the other arm of the lever 141 by a pin-and-slot connection.

When the indicating instrument of FIG. 11 is not in use, the slide 137 is held in the illustrated position in which it overlies the surface 135 of the prism 131A and conceals the terminals 134. When the user thereupon depresses the knob which can move the rod 142 downwardly, the lever 141 retracts the slide 137 so that the surface 132 can reflect the images of the scale 138 and one or more terminals 134 toward the exposed surface 132A. Since the scale 138 is located between the surface 135 and the terminals 134, such terminals are concealed by the opaque portions of the scale in each of their end positions in the same way as described for the images 130, 131 of the terminals shown in FIG. 9. The slide 137 can be replaced with several discrete slides, one for each of the moving-coil instruments 130A.

It will be noted that the mirrored surface 132 faces away from and that the surface 135 faces toward the pivot axis of the pointer 133. Indicating instruments of the type shown in FIGS. 8 to 11 can be used with advantage in radio receivers or like apparatus. In such apparatus, the means for pivoting the pointers 105, 106 or 133 may be manipulated by hand, preferably by way of a mechanism or circuitry which replaces the control circuit 128 and begins to pivot the second pointer when the preceding pointer reaches its extreme position. For example, when the first of a series of two or more pointers reaches its extreme position (of maximum deflection from zero position), it can actuate a switch which activates the pivoting means for the next-following pointer and causes the movement of the corresponding screen or slide to or from its inserted position.

Figure 12:
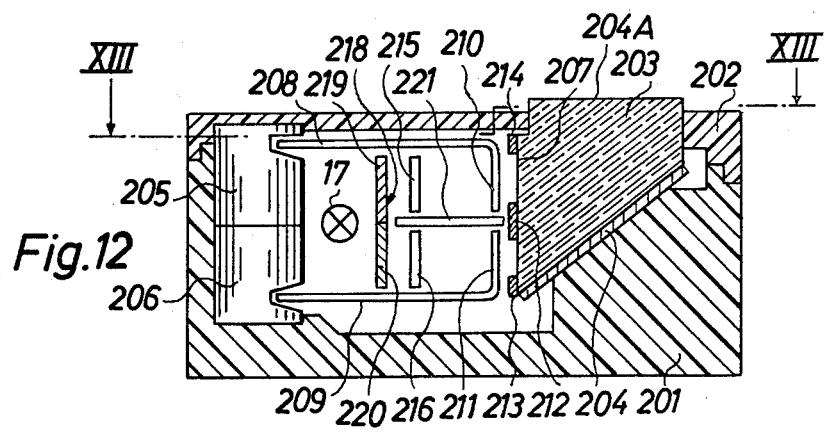
FIG. 12 is a central sectional view of an indicating instrument with several pointers which constitutes a further modification of the instrument shown in FIGS. 8 and 9.
Figure 13:
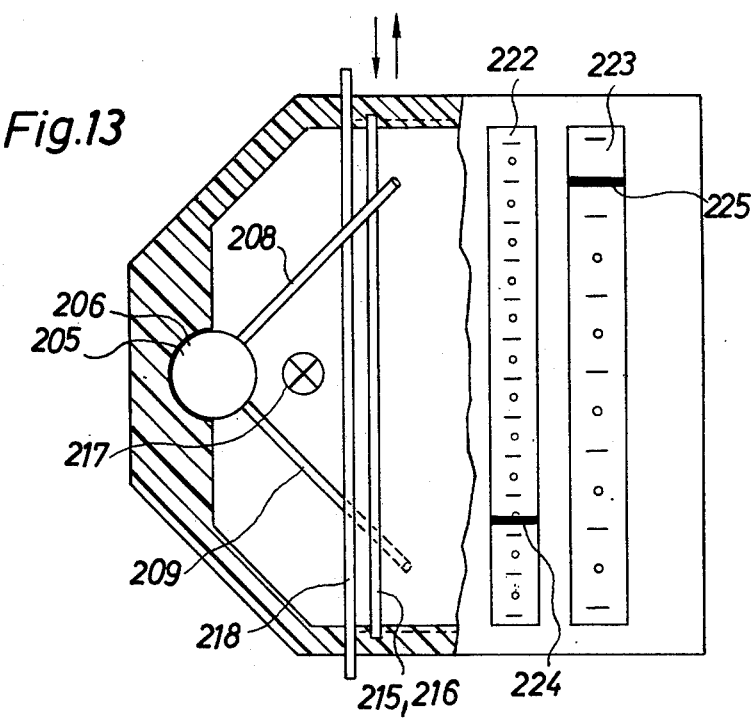
FIG. 13 is a sectional view as seen in the direction of the arrows from the ;ome XIII—XIII of FIG. 12.

The housing of the indicating instrument shown in FIGS. 12 and 13 comprises two separable portions including a first portion or base 201 and a second portion or cover 202. The housing contains a one-piece prism 203 whose exposed surface 204A is outwardly adjacent to the exposed side of the portion 202. The mirrored surface of the prism 203 is shown at 204, and the prism has a further surface 207 which makes with the exposed surface 204A an angle of 90 degrees. The housing further contains two coaxial moving-coil instruments 205, 206 having pointers 208, 209 which are pivotable about a common axis. The terminals of the pointers 208, 209 are respectively shown at 210 and 211; these terminals are parallel to the pivot axis of the pointers and to the surface 207 of the prism 203. It will be noted that the terminals 210, 211 extend toward each other, i.e., that the distance between their free ends is less than the distance between any other parts of the terminals. The main portions of the pointers 208, 209 are pivotable in two parallel planes.

Portions of the surface 207 of the prism 203 are covered by opaque strips or masks 212, 213, 214 so that such masks form two elongated parallel windows 222, 223 shown in FIG. 13. The housing further accommodates two scales 215, 216 which are respectively located in front of the windows 223, 222. A light source 217 is mounted in the housing between the moving-coil instruments 205, 206 and the scales 215, 216. A slide 218 is reciprocable in the housing between the light source 217 and the scales 215, 216. This slide has a first section or panel 219 which overlaps the scale 215 and a second section or panel 220 which overlaps the scale 216. The two sections are preferably of different color and the slide 218 consists of light-transmitting material. The directions in which the slide 218 is movable lengthwise of the prism 203 are indicated by arrows shown in FIG. 13. An opaque septum 221 is disposed between the scales 215, 216 and extends to the mask 212 to insure that light issuing from the source 217 forms two discrete beams one of which passes through the section 219 and scale 215 to impinge on the window 223 and the other of which passes through the section 220 and scale 216 to impinge on the window 222. The means for reciprocating the slide 218 is not shown in FIG. 13. This slide can be replaced with two discrete differently colored slides, one for each of the scales 215, 216.

The image 225 of the terminal 210 is reflected by the surface 204 so that it appears as a bar or strip which travels sideways lengthwise of the image of the scale 215. The image 224 of the terminal 211 travels sideways lengthwise of the image of the scale 216. The scales 215, 216 consist of light-transmitting material. As shown in FIG. 13, each of the terminals 210, 211 is movable along the full length of the surface 207. An advantage of the indicating instrument of FIGS. 12 and 13 is that a single prism, having a single mirrored surface, can reflect the images of several terminals in a space-saving manner. It is clear that the two discrete scales 215, 216 can be replaced with a single scale having two rows of graduations, one for each of the terminals 210, 211.

Figure 14:
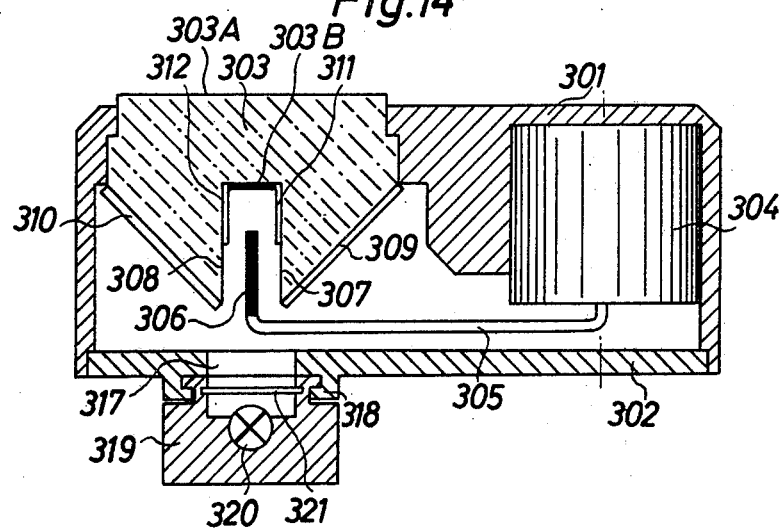
FIG. 14 illustrates in sectional view a further instrument wherein the terminal of the pointer is movable in a recess of the prism.
Figure 15:
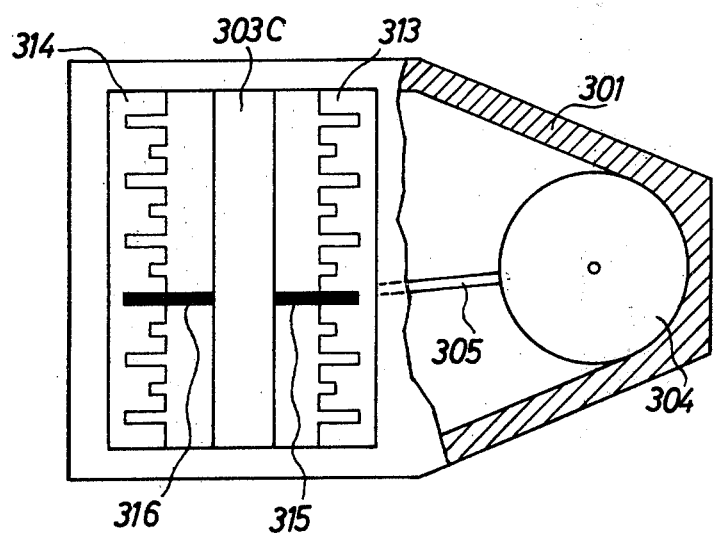
FIG. 15 is a front elevational view as seen from the upper side of FIG. 14, with a portion of the housing broken away.

The housing of the indicating instrument shown in FIGS. 14 and 15 comprises two portions 301, 302 and contains a one-piece prism 303 having two mirrored surfaces 309, 310. The moving-coil instrument 304 has a pointer 305 whose terminal 306 is parallel to the pivot axis of the pointer and extends into a longitudinally extending recess provided in the prism 303 between the mirrored surfaces 309, 310. The recess is flanked by the surfaces 307, 308 which are parallel to the terminal 306 in each angular position of the pointer 305. The surfaces 307, 308 of the prism 303 do not reflect light; they are respectively provided with scales 311, 312 whose graduations are shown in FIG. 15. The surface 309 reflects the image 313 of the scale 311 and the image 315 of the terminal 306, and the surface 310 reflects the image 314 of the scale 312 and the image 316 of the terminal 306. The surfaces 307, 308 make acute angles with the respective mirrored surfaces 309, 310.

FIG. 15 shows that the images 313, 314 of the scales 311, 312 are parallel to and spaced from each other and that the images 315, 316 of the terminal 306 resemble bars or strips which move sideways lengthwise of the respective images 313, 314.

The aforementioned recess of the prism 303 is located in front of an elongated slot or opening 317 provided in the housing portion 302. The portion 302 is further provided with a socket or shoe 318 which can receive a longitudinally movable illuminating devide 319 containing a slide or screen 321 and a light source 320. The light source 320 can constitute an elongated tubular lamp or it may consist of a row or two or more discrete lamps. The slide 321 is colored and consists of light-transmitting material. The exposed surface of the prism 303 is shown at 303A.

An advantage of the indicating instrument of FIGS. 14 and 15 is that a single prism can furnish two images of a single terminal. The bottom surface 303B in the recess of the prism 303 is preferably coated with a layer of opaque material to insure that the images 313, 314 of the scales 311, 312 are separated from each other by an opaque strip 303C.

The scales 311, 312 can be applied to or be placed adjacent to the surfaces 307, 308.

Referring to FIG. 16, there is shown a further indicating instrument which constitutes a modification of the instrument shown in FIGS. 14 and 15. All such parts of the instrument of FIG. 16 which are clearly analogous to or identical with the corresponding parts of the instrument shown in FIGS. 14-15 are denoted by similar reference characters.

The housing, consisting of portions 301 and 302, contains a prism which includes two discrete parts 330, 331 each having an exposed surface 330A, 331A, a mirrored surface 334, 335 and a further surface 332, 333. The two parts of the prism are mirror symmetrical to each other with reference to a plane which extends midway between the surfaces 332, 333. These surfaces make acute angles with the respective mirrored surfaces 334, 335 and are parallel to each other.

The parts 330, 331 of the prism are separated from each other by an opaque insert 336 whose outer side is flush with the exposed surfaces 330A, 331A and which defines with the parts of the prism a recess for the terminal 306 of the pointer 305. The insert 336 insures that the images of the scales 311, 312 on the surfaces 332, 333 are separated from each other by a distance corresponding to the width of the insert.

The indicating instrument of FIG. 16 further comprises two reciprocable slides or screens 337, 338 which consist of colored light-transmitting material and are respectively adjacent to the surfaces 332, 333. The coloring of the slide 337 is preferably different from that of the slide 338. These slides are reciprocable in the recess between the insert 336 and parts 330, 331 of the prism in the longitudinal direction of the scales 311, 312. The linkage or other means for moving the slides with reference to the housing is not shown in FIG. 16.

If desired, the scales 311, 312 can be secured to or made integral with the respective slides 337, 338. Thus, each of these scales can be inserted and withdrawn independently of the other scale. This enables the operator to completely conceal that scale which is not to be seen when the operator wishes to observe the image of the terminal 306 with reference to the other scale. The aforementioned means for moving the slides 337, 338 can be coupled with means for changing the measuring range of or for otherwise adjusting the moving-coil instrument 304 in response to insertion or withdrawal of the slide 337 or 338.

The feature that the scales 311, 312 are adjustable lengthwise of the surfaces 332, 333 facilitates the calibration of the indicating instrument. Also, such adjustability of the scales facilitates the assembly of the indicating instrument and enhances its versatility.

If the slides 337, 338 consist of opaque material, they serve to conceal the respective scales and the respective images of the terminal 306. Thus, if the user wishes to observe only the scale 311, the slide 338 is moved to its inserted position to conceal the scale 312 (it being assumed that the slide 338 is opaque).

The indicating instrument of FIGS. 1a to 1b can be used in radio receivers, television receivers and/or in many other electrical apparatus to indicate one or more variables.

It is clear that the improved indicating instrument is susceptible of many additional modifications. For example, the housing of each of the illustrated embodiments can be proovided with outwardly extending terminals for connection of the respective moving-coil instrument(s) to circuits whose condition is to be indicated by the associated pointer or pointers. Moreover, the housing of each indicating instrument can be provided with means for adjusting the measuring range (sensitivity) of the corresponding movingcoil instrument(s). Furthermore, the housing of each indicating instrument which contains a plurality of scales can be provided with one or more discrete light sources for each scale and the corresponding surface of the prism, and with means for independently completing or opening the circuits of such light sources. A common illuminating device for several scales can be provided with several light sources and light admitting means. Also, the pointer or pointers of our indicating instrument can receive motion from galvanometers, other types of moving-coil instruments, and/or any other suitable pivoting means.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. An indicating instrument, comprising a housing; a prism installed in said housing and having at least one mirrored light-reflecting surface and a plurality of additional surfaces including an exposed surface and a second additional surface, said surfaces meeting each other along a plurality of elongated edges, at least said mirrored ligh-reflecting surface being a plane surface; a pointer mounted in said housing for pivotal movement about a predetermined axis, said pointer having an elongated terminal which is adjacent to said prism, at least substantially parallel to said axis and to said second additional surface and at least substantially normal to said edges in each position of said pointer; means for pivoting said pointer; and stationary scale means provided in said housing in such a position so as to be observable, with at least a portion of said terminal, by looking through said exposed surface of said prism at which the image of said scale means will have a rectilinear configuration with the image of said terminal of said pointer moving parallel to itself along said rectilinear image of said scale means.

2. An indicating instrument as defined in claim 1, wherein said second additional surface is a flat surface.

3. An indicating instrument as defined in claim 1, wherein said mirrored surface and said second additional surface make an acute angle and said mirrored surface faces away from said terminal.

4. An indicating instrument as defined in claim 1, wherein said scale means is immediately adjacent to said second additional surface and wherein said second additional surface is positioned with reference to said mirrored surface in such a way that the latter reflects the images of said terminal and said scale means toward said exposed surface.

5. An indicating instrument as defined in claim 1, wherein the width of said second additional surface exceeds the width of said exposed surface.

6. An indicating instrument as defined in claim 1, wherein said scale means is of arcuate shape and its curvature at most equals the curvature of the path along which said terminal moves in response to pivoting of said pointer about said axis.

7. An indicating instrument as defined in claim 1, wherein said second additional surface is a convex surface having a curvature which at most equals the curvature of the arcuate path along which said terminal moves in response to pivoting of said pointer about said axis.

8. An indicating instrument as defined in claim 1, wherein said additional surfaces include a third surface which is parallel to said exposed surface and is flanked by said mirrored surface and said second additional surface.

9. An indicating instrument as defined in claim 8, wherein said scale means is adjacent to said second additional surface and wherein said mirrored surface is arranged to reflect the images of said scale means and said terminal toward said exposed surface, and further comprising second scale means adjacent to said third additional surface, said second scale means being visible directly through said exposed surface.

10. An indicating instrument as defined in claim 9, wherein said second scale means has a concave side facing said third additional surface.

11. An indicating instrument as defined in claim 8, wherein said scale means is adjacent to said third additional surface so as to be observable directly through said exposed surface.

12. An indicating instrument as defined in claim 1, wherein said mirrored surface faces toward said axis.

13. An indicating instruments as defined in claim 1, wherein said second additional surface faces toward said axis.

14. An indicating instrument as defined in claim 1, wherein at least a portion of said scale means transmits light.

15. An indicating instrument as defined in claim 1, wherein at least a portion of said scale means consists of light-transmitting material.

16. An indicating instrument as defined in claim 1, wherein the means for pivoting said pointer comprises a moving-coil instrument.

17. An indicating instrument, comprising a housing; a prism installed in said housing and having at least one mirrored light-reflecting surface and a plurality of additional surfaces including an exposed surface and a second additional surface, said surfaces meeting each other along a plurality of elongated edges, at least said mirrored light-reflecting surface being a plane surface; a first pointer mounted in said housing for pivotal movement about a first axis, said first pointer having an elongated first terminal which is adjacent to said prism, at least substantially parallel to said axis and to said second additional surface and at least substantially normal to said edges in each position of said pointer; means for pivoting said first pointer; a second pointer pivotable about a second axis which is parallel to said first axis; means for pivoting said second pointer, said second pointer having a second terminal parallel to said first terminal and said terminals being movable along predetermined portions of said second additional surface in response to pivoting of the respective pointer; and scale means provided in said housing in such a position such as to be observable, with at least a portion of said terminals, by looking through the exposed surface of said prism at which the image of said scale means will have a rectilinear configuration.

18. An indicating instrument as defined in claim 17, wherein each of said pointers comprises a portion disposed between the respective terminal and the respective axis, said portions of said pointers being located in a common plane.

19. An indicating instrument as defined in claim 17, wherein said scale means comprises a discrete scale for each of said terminals.

20. An indicating instrument as defined in claim 17, wherein each of said terminals is movable from a zero position to an extreme position and further comprising means for concealing one of the terminals in said zero position and the other terminal in said extreme position thereof.

21. An indicating instrument as defined in claim 20, wherein said means for concealing constitutes an opaque portion of said scale means.

22. An indicating instrument as defined in claim 20, wherein said means for concealing is provided on the second additional surface of said prism.

23. An indicating instrument as defined in claim 17, further comprising at least one screen movable into and from a position of overlap with said second additional surface, and means for moving said screen.

24. An indicating instrument as defined in claim 17, further comprising a plurality of screens, one for each of said pointers, and means for moving said screens into and from positions of overlap with the respective portions of said additional surface.

25. An indicating instrument comprising a housing; a prism installed in said housing and having at least one mirrored light-reflecting surface and a plurality of additional surfaces including an exposed surface and a second additional surface, said surfaces meeting each other along a plurality of elongated edges, at least said mirrored light-reflecting surface being a plane surface; a pointer mounted in said housing for pivotal movement about a predetermined axis, said pointer having an elongated terminal which is adjacent to said prism, at least substantially parallel to said axis and to said second additional surface and at least substantially normal to said edges in each position of said pointer; means for pivoting said pointer; screen means movable into and from a position of overlap with said second additional surface, said screen means having at least a portion consisting of light-transmitting material; means for moving said screen means; and scale means provided in said housing in such a position as to be observable, with at least a portion of said terminal, by looking through the exposed surface of said prism at which the image of said scale means will have a rectilinear configuration.

26. An indicating instrument as defined in claim 25, wherein at least said portion of said screen means is colored.

27. An indicating instrument comprising a housing; a prism installed in said housing and having at least one mirrored light-reflecting surface and a plurality of additional surfaces including an exposed surface and a second additional surface, said surface meeting each other along a plurality of elongated edges, at least said mirrored light-reflecting surface being a plane surface; a pointer mounted in said housing for pivotal movement about a predetermined axis, said pointer having an elongated terminal which is adjacent to said prism, at least substantially parallel to said axis and to said second additional surface and at least substantially normal to said edges in each position of said pointer; means for pivoting said pointer; screen means movable into and from a position of overlap with said second additional surface; means for moving said screen means and including a manually movable member and a linkage for transmitting motion from said manually movable member to said screen means; and scale means provided in said housing in such a position so as to be observable, with at least a portion of said terminal, by looking through the exposed surface of the prism at which the image of said scale means will have a rectilinear configuration.

28. An indicating instrument as defined in claim 17, wherein said means for pivoting said first pointer comprises a first moving-coil instrument and said means for pivoting said second pointer a second moving-coil instrument, and including a plurality of screens, one for each of said terminals, and means for moving said screens into and from positions of overlap with the respective portion of said second additional surface, said means for moving said screen means including first and second manually operable means and means for transmitting motion from said manually movable means to the respective screens.

29. An indicating instrument as defined in claim 28, further comprising means for changing the condition of the circuits of the respective moving-coil instruments in response to actuation of said manually movable means.

30. An indicating instrument as defined in claim 17, wherein each of said pivoting means comprises a moving-coil instrument, wherein said terminals are movable along said predetermined portions of said second additional surface between a zero position and an extreme position, and including means for completing the circuit of the moving-coil instrument for said second pointer in response to movement of said first terminal to said extreme position.

31. An indicating instrument comprising a housing; a prism installed in said housing and having at least one mirrored light-reflecting surface and a plurality of additional surfaces including an exposed surface and a second additional surface, said surfaces meeting each other along a plurality of elongated edges, at least said mirrored light-reflecting surface being a plane surface; a first pointer mounted in said housing for pivotal movement about a first axis, said pointer having an elongated first terminal which is adjacent to said prism at least substantially parallel to said first axis and to said second additional surface and at least substantially normal to said edges in each position of said pointer; means for pivoting said first pointer; a second pointer having a second terminal parallel to said first terminal; means for pivoting said second pointer, each of said pointers having a portion disposed between the respective terminal and the respective pivoting means and such portions of said pointers being pivotable in parallel planes, said terminals being movable along separate portions of said second additional surfaces; and scale means provided in said housing in such a position so as to be observable with at least a portion of said terminals, by looking through the exposed surface of said prism at which the image of said scale means will have a rectilinear configuration.

32. An indicating instrument as defined in claim 31, wherein the pivot axis of said second pointer coincides with said first mentioned axis.

33. An indicating instrument as defined in claim 31, wherein said scale means comprises a single scale registering with said second additional surface and having discrete first and second portions along which the respective terminals move in response to pivoting of the corresponding pointers.

34. An indicating instrument comprising a housing; a prism installed in said housing and having a first and a second mirrored light-reflecting surface and a plurality of additional surfaces including an exposed surface, a second and a third additional surface, said surfaces meeting each other along a plurality of elongated edges, said second and third additional surfaces respectively making acute angles with said first and second mirrored surfaces, at least said mirrored light-reflecting surfaces being plane surfaces; a pointer mounted in said housing for pivotal movement about a predetermined axis, said pointer having an elongated terminal which is adjacent to said prism, at least substantially parallel to said axis and to said second additional surface and at least substantially normal to said edges in each position of said pointer and said terminal being disposed between said second and third additional surfaces, and each of said mirrored surfaces being arranged to reflect a separate image of said terminal towards said exposed surface; means for pivoting said pointer; and scale means provided in said housing in such a position so as to be observable, with at least a portion of said terminal, by looking through the exposed surface of said prism at which the image of said scale means will have a rectilinear configuration.

35. An indicating instrument as defined in claim 34, wherein said second additional surface is parallel to said third additional surface.

36. An indicating instrument as defined in claim 34, wherein said prism is a one-piece body.

37. An indicating instrument as defined in claim 36, wherein said body has a longitudinally extending recess which is flanked by said second and third additional surfaces.

38. An indicating instrument as defined in claim 34, wherein said prism comprises two discrete parts each of which is provided with one of said mirrored surfaces and with one of said second and third additional surfaces.

39. An indicating instrument as defined in claim 34, wherein said scale means comprises two discrete scales each adjacent to one of said second and third additional surfaces.

40. An indicating instrument as defined in claim 34, further comprising a pair of screens each movable into and from a position of overlap with one of said second and third additional surfaces.

41. An indicating instrument as defined in claim 34, wherein said scale means comprises two discrete scales each adjacent to one of said second and third additional surfaces, said scales being movable lengthwise of the respective additional surfaces.

42. An indicating instrument comprising a housing; a prism installed in said housing and having at least one mirrored light-reflecting surface and a plurality of additional surfaces including an exposed surface and a second additional surface, said surfaces meeting each other along a plurality of elongated edges, at least said mirrored light-reflecting surface being a plane surface; a pointer mounted in said housing for pivotal movement about a predetermined axis, said pointer having an elongated terminal which is adjacent to said prism, at least substantially parallel to said axis and to said second additional surface and at least substantially normal to said edges in each position of said pointer; means for pivoting said pointer; an opaque screen movable to and from a position of overlap with said second additional surface; and scale means provided in said housing in such a position so as to be observable, with at least a portion of said terminal, by looking through the exposed surface of said prism at which the image of said scale means will have a rectilinear configuration.

* * * * *